(12) United States Patent
Baldauf et al.

(10) Patent No.: US 7,461,959 B2
(45) Date of Patent: Dec. 9, 2008

(54) CIGARETTE LIGHTER

(75) Inventors: Albert Baldauf, Hanau (DE); Ronald Schwarzbach, Frankfurt (DE); Norbert Graeser, Frankfurt (DE)

(73) Assignee: Casco Schoeller GmbH, Frankfurt am Main (DE)

( * ) Notice: Subject to any disclaimer, the term of this patent is extended or adjusted under 35 U.S.C. 154(b) by 58 days.

(21) Appl. No.: 11/531,523

(22) Filed: Sep. 13, 2006

(65) Prior Publication Data

US 2007/0081334 A1    Apr. 12, 2007

(30) Foreign Application Priority Data

Sep. 13, 2005  (DE) ................ 10 2005 043 798
Oct. 12, 2005  (DE) ................ 10 2005 048 864

(51) Int. Cl.
*B60Q 1/00*    (2006.01)
*F21V 11/00*   (2006.01)
*H05B 1/00*    (2006.01)

(52) U.S. Cl. .............. 362/488; 362/487; 362/489; 362/545; 362/546; 219/220

(58) Field of Classification Search .............. 362/109, 362/253, 470, 473, 477–478, 482, 484, 487–489, 362/545–546; 219/220
See application file for complete search history.

(56) References Cited

U.S. PATENT DOCUMENTS 6,538,236 B1    3/2003    Rostan (Continued)

FOREIGN PATENT DOCUMENTS

DE    69204149 T    1/1996

(Continued)

OTHER PUBLICATIONS

European Patent Office. European Search Report dated Sep. 28, 2007. European Patent Application No. 06018923.0-2424. German Language. 3 pages.

*Primary Examiner*—Sharon Payne
*Assistant Examiner*—Sean P Gramling
(74) *Attorney, Agent, or Firm*—Sterne, Kessler, Goldstein & Fox PLLC

(57) ABSTRACT

Cigarette lighter having a main unit comprising a substantially cylindrical heating insert and a substantially sleeve-like lighter body to receive the heating insert, comprising a substantially annular attachment of transparent and light-guiding material which is slid onto the main unit, for illuminating a region of the cigarette lighter which is visible to a viewer when the cigarette lighter is in the installed state, which attachment has an entry opening for light to couple light into the attachment to enable the attachment to be illuminated, and comprising a lighting unit, fastened to the attachment, having a receiving unit to receive a lighting insert which can be inserted as an exact fit, the lighting insert having at least one light-producing means, characterized in that the receiving unit is provided with at least one aperture serving as an exit opening for light and in that the lighting insert is arranged in the receiving unit between the entry opening for light in the attachment and the exit opening for light in the receiving unit, the at least one light-producing means facing towards the entry opening for light in the attachment and/or the exit opening for light in the receiving unit.

9 Claims, 4 Drawing Sheets

U.S. PATENT DOCUMENTS

| | | |
|---|---|---|
| 7,063,447 B2 | 6/2006 | Andrieu et al. |
| 2005/0099800 A1 * | 5/2005 | Andrieu et al. ............. 362/109 |

FOREIGN PATENT DOCUMENTS

| | | |
|---|---|---|
| DE | 19756701 | 7/1998 |
| DE | 60012290 T | 8/2005 |
| EP | 0819575 | 1/1998 |
| EP | 1 516 777 A | 3/2005 |

* cited by examiner

- Figure 1 -

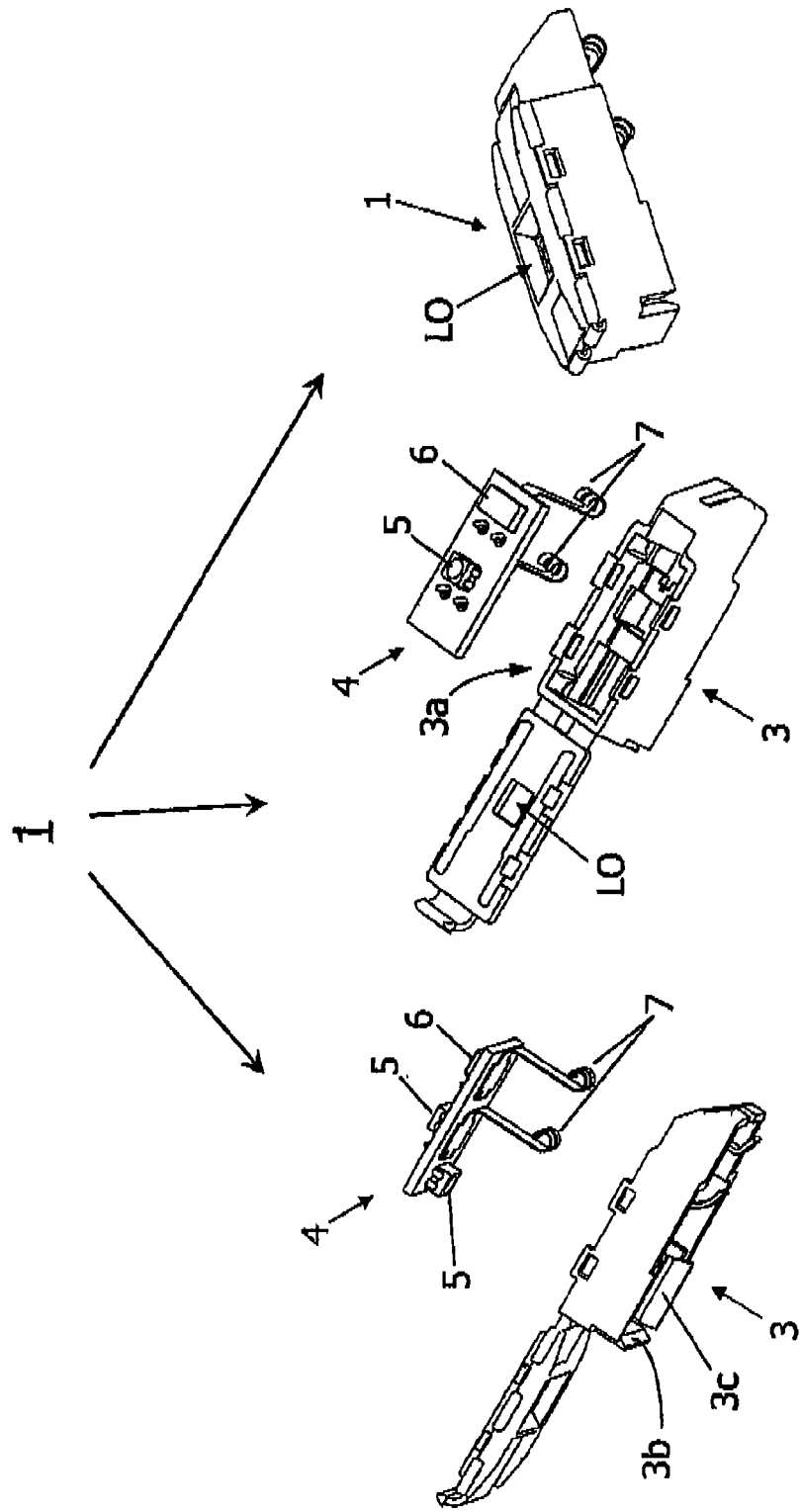
- Figure 4 -

CIGARETTE LIGHTER

BACKGROUND OF THE INVENTION

1. Field of the Invention

The present invention relates to an electrical cigarette lighter, particularly for powered vehicles, having a lighting unit for illuminating the said electrical cigarette lighter, the term "powered vehicle" being understood to mean all terrestrial vehicles, water-borne and underwater craft, aerial craft, spacecraft and other vehicles.

2. Background Art

BRIEF SUMMARY OF THE INVENTION

Conventional electrical cigarette lighters which are used in powered vehicles, in passenger cars for example, each comprise an incandescent bulb which is part of a lighting unit. When a d.c. voltage is applied to this lighting unit—the d.c, voltage usually being approx. 13.4 V in a passenger car—a lighting attachment, made of a light-guiding material, which is inserted on the main unit of a cigarette lighter is illuminated by this incandescent bulb and in turn ensures that a region of the cigarette lighter which is visible to a viewer when the cigarette lighter is in the installed state is illuminated or backlit and allows the cigarette lighter to be located, particularly in the dark.

Something that is disadvantageous about a lighting unit of this kind is that the basis for it is a complex assembly process which often causes damage to it and breakdowns of it, as a result for example of distortion of the contacts or damage to the incandescent bulb. Added to this, there is the relatively short lives of incandescent bulbs and their vulnerability to mechanical and electrical forces.

In the development of powered vehicles, increasing value is being placed on the backlighting of the indicating devices and controls in the interior being designed to be of a harmonized overall appearance. The color and brightness of indicating devices, such for example as the instrument panel or instrument cluster in the interior of a passenger car, and of controls have to be matched to one another. Particularly because it is known that not only incandescent bulbs but also light-emitting diodes (LED's) are now being used for backlighting in the interior of powered vehicles, such as for backlighting the instrument cluster and the like for example, and because the said light-emitting diodes are becoming increasingly common in the interior of powered vehicles, limits are set to any design of the backlighting in the interior to be of a harmonized overall appearance because, due to their different radiating characteristics, incandescent bulbs and light-emitting diodes differ in the way they look, subjectively, to the viewer.

It is also known that in many powered vehicles the backlighting of the indicating devices and controls can be dimmed, thus enabling the brightness of the backlighting to be set to suit the individual, However, unlike light-emitting diodes, incandescent bulbs are not easy to dim, because, if the vehicle's supply voltage (which is approx. 13.4 V) is taken below a certain critical threshold of about 6 V, incandescent bulbs simply go out.

From EP 0 819 575 is known a lighting device for a cigarette lighter which comprises an illuminated ring which acts as a clamping sleeve for fixing the socket of a cigarette lighter to a part of a vehicle. What is used as a light-producing means for the illuminated ring is a light-emitting diode which is arranged in a housing. To allow the light emitted by the light-emitting diode to be coupled into the illuminated ring, the latter is provided with a light-guiding tongue which acts as a light guide and which forms an integral part, made of the same material, of the housing holding the light-producing means of the lighting device.

Something which is disadvantageous about this lighting device is that the light emitted by the light-producing means can only be used to illuminate the illuminated ring.

The object underlying the invention is therefore to provide a cigarette lighter having a lighting device which is easy to fit and does not cause any assembly-related breakdowns.

The object underlying the invention is also to provide a cigarette lighter having a lighting device which enables the cigarette lighter and/or an ashtray to be lighted in a harmonized manner.

The object underlying the invention is also to provide a cigarette lighter having a lighting device which assists in enabling the backlighting of the indicating devices and controls in the interior of a powered vehicle to be designed to be of a unified overall appearance.

These objects are achieved, in accordance with the invention, by virtue of the features specified in claim 1. Preferred embodiments of the invention form the subject matter of the dependent claims.

The cigarette lighter according to the invention comprises a main unit comprising a substantially cylindrical heating insert and a substantially sleeve-like lighter body to receive the heating insert, comprising a substantially annular attachment of transparent and light-guiding material which is slid onto the main unit, for illuminating a region of the cigarette lighter which is visible to a viewer when the cigarette lighter is in the installed state, which attachment has an entry opening for light to couple light into the attachment to enable the attachment to be illuminated, and comprising a lighting unit, fastened to the attachment, having a receiving unit to receive a lighting insert which can be inserted as an exact fit, the lighting insert having at least one light-producing means.

In accordance with the invention, the receiving unit is provided with at least one aperture serving as an exit opening for light to couple out the light emitted by the at least one light-producing means, to enable an ashtray to be illuminated. The lighting insert is arranged in the receiving unit between the entry opening for light in the attachment and the exit opening for light in the receiving unit, the at least one light-producing means facing towards the entry opening for light in the attachment and/or the exit opening for light in the receiving unit.

The cigarette lighter according to the invention is distinguished by being able to be installed easily, thus doing away with the failures of the lighting devices of conventional cigarette lighters caused by assembly which were described in the introduction.

However, the crucial advantage of the cigarette lighter according to the invention lies in the fact that the receiving unit of the lighting unit can be fitted with lighting inserts of different designs, it being possible for the individual lighting inserts to have different configurations of light-producing means as dictated by the particular application.

Because the at least one light-producing means faces towards the entry opening for light in the attachment and/or the exit opening for light in the receiving unit, the cigarette lighter according to the invention allows either only the cigarette lighter to be illuminated, or only the ashtray to be illuminated, or both the cigarette lighter and the ashtray to be illuminated, as desired.

The at least one exit opening for light in the receiving unit has the advantage that the ashtray can be illuminated not just with the residual light from the cigarette lighter but can itself be illuminated by the at least one light-producing means independently of the cigarette lighter. By means of a light guide arranged close to the at least one light-producing means, the light emitted by the latter can be guided to the ashtray, which is arranged in the vicinity of the cigarette lighter.

In a preferred embodiment of the invention, the receiving unit of the lighting unit is preferably fastened to the attachment of the cigarette lighter according to the invention by a snap-on or latch-on connection. For this purpose, the receiving unit is usefully provided with latching lips which preferably engage behind projections provided for the purpose on a fastening portion of the attachment by a snap-on or latch-on action. The receiving unit of the lighting unit advantageously also comprises at least one lip which engages in at least one slot provided for it in the attachment, to enable the receiving unit to be locked in position relative to the attachment of the cigarette lighter according to the invention. Basically, the receiving unit may also be clamped or adhesive-bonded to the attachment. As an alternative, it is also conceivable for the attachment and the receiving unit to be a single unit formed all in one piece.

In a further embodiment of the invention, the receiving unit comprises a first housing part to receive the printed circuit board and a second housing part acting as a housing cover. The second housing part is provided in this case, on its side which is at the top in the in-use position, with the at least one aperture which acts as an exit opening for light for coupling out the light emitted by the at least one light-producing means for the purpose of illuminating the ashtray.

The receiving unit is preferably all in one piece. The second housing part is usefully fastened in place in such a way as to be rotatable on the first housing part, by means of a film joint acting as a closing hinge.

The receiving unit may be of a substantially box-like form, the first housing part preferably having a rectangular recess to receive the lighting insert, which is usefully of a rectangular form for this purpose.

In a further preferred embodiment of the invention, the second housing part of the receiving unit is provided with locking members for locking the first housing part of the receiving unit to its second housing part. The locking members of the second housing part preferably take the form of rectangular and/or curved latching tongues or latching lips (snap-ons), the rectangular latching tongues latching into preferably rectangular apertures which are provided for them in the first housing part and the curved latching tongues engaging behind projections which are provided for them on the first housing part. The apertures in the first housing part and the latching tongues or latching lips on the second housing part may, in principle, also be of other forms.

Both the attachment and the receiving unit of the cigarette lighter according to the invention preferably take the form of injection mouldings of plastics material.

In a particularly preferred embodiment of the invention, the lighting insert is in the form of a printed circuit board.

In another particularly preferred embodiment of the invention, the at least one light-producing means is a light-emitting diode (LED).

What is advantageous about the use of the light-emitting diode as a light-producing means is that, compared with conventional cigarette lighters illuminated by an incandescent bulb, harmonized illumination becomes possible of the region of the cigarette lighter which is visible to the viewer when the cigarette lighter is in the installed state and/or of the ashtray. In conjunction with the good dimmability of the light-emitting diode (LED) as a light-producing means, which can continue to be dimmed even below the threshold of approx. 6 V for the vehicle's supply voltage which is critical for the incandescent bulbs of conventional cigarette lighters for backlighting the indicating devices and controls, the present harmonized illumination of the cigarette lighter according to the invention and/or of the ashtray makes an advantageous contribution to the designing of the backlighting to be of a unified overall appearance and, at the same time, to ergonomic and functional backlighting for the indicating devices and controls in the interior.

A further advantageous basic property of the light-emitting diode is its considerably longer life compared with an incandescent bulb. The intervals at which the light-emitting diode has to be replaced are therefore appreciably longer as well in comparison with an incandescent bulb.

An embodiment of the invention will be explained in detail in what follows by reference to the drawings.

BRIEF DESCRIPTION OF THE DRAWINGS/FIGURES

FIG. 4 is a further exploded view of the lighting unit shown in FIG. 3.

DETAILED DESCRIPTION OF THE INVENTION

Figure 1:
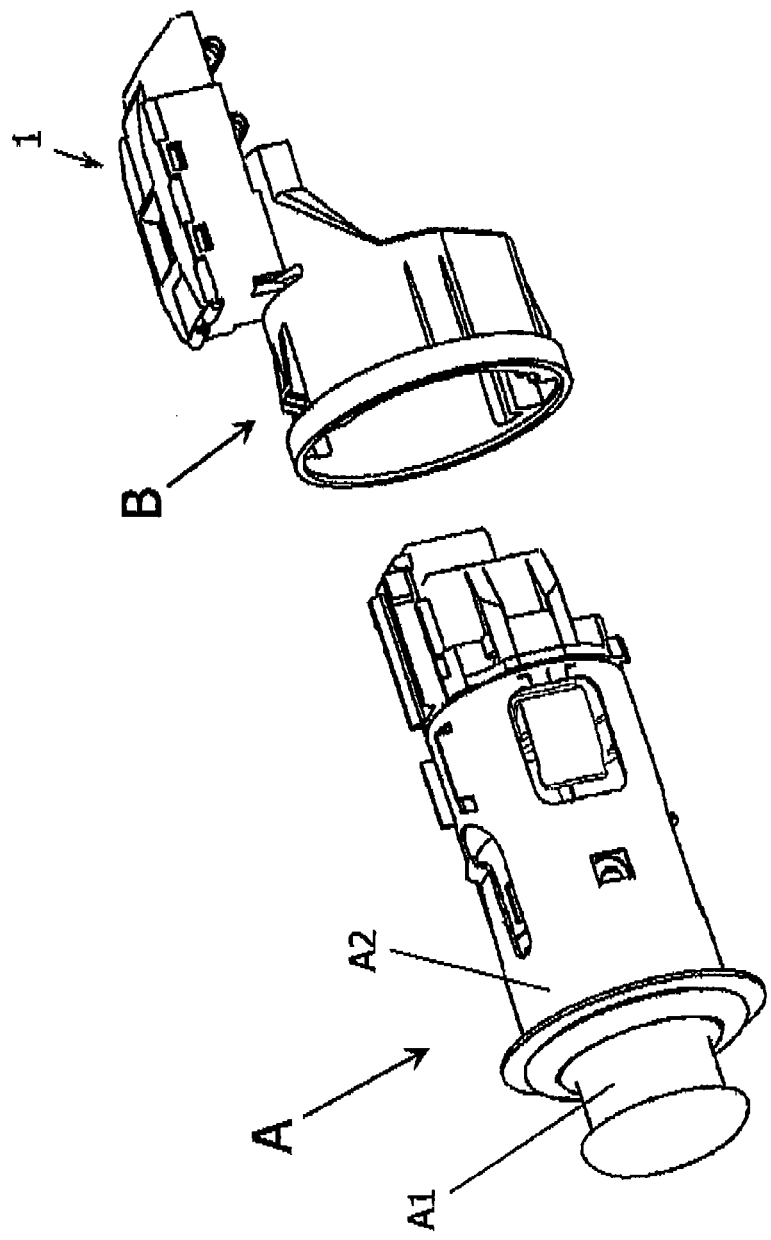
FIG. 1 is a perspective view, or rather a partly exploded view, of a cigarette lighter according to the invention.
Figure 2:
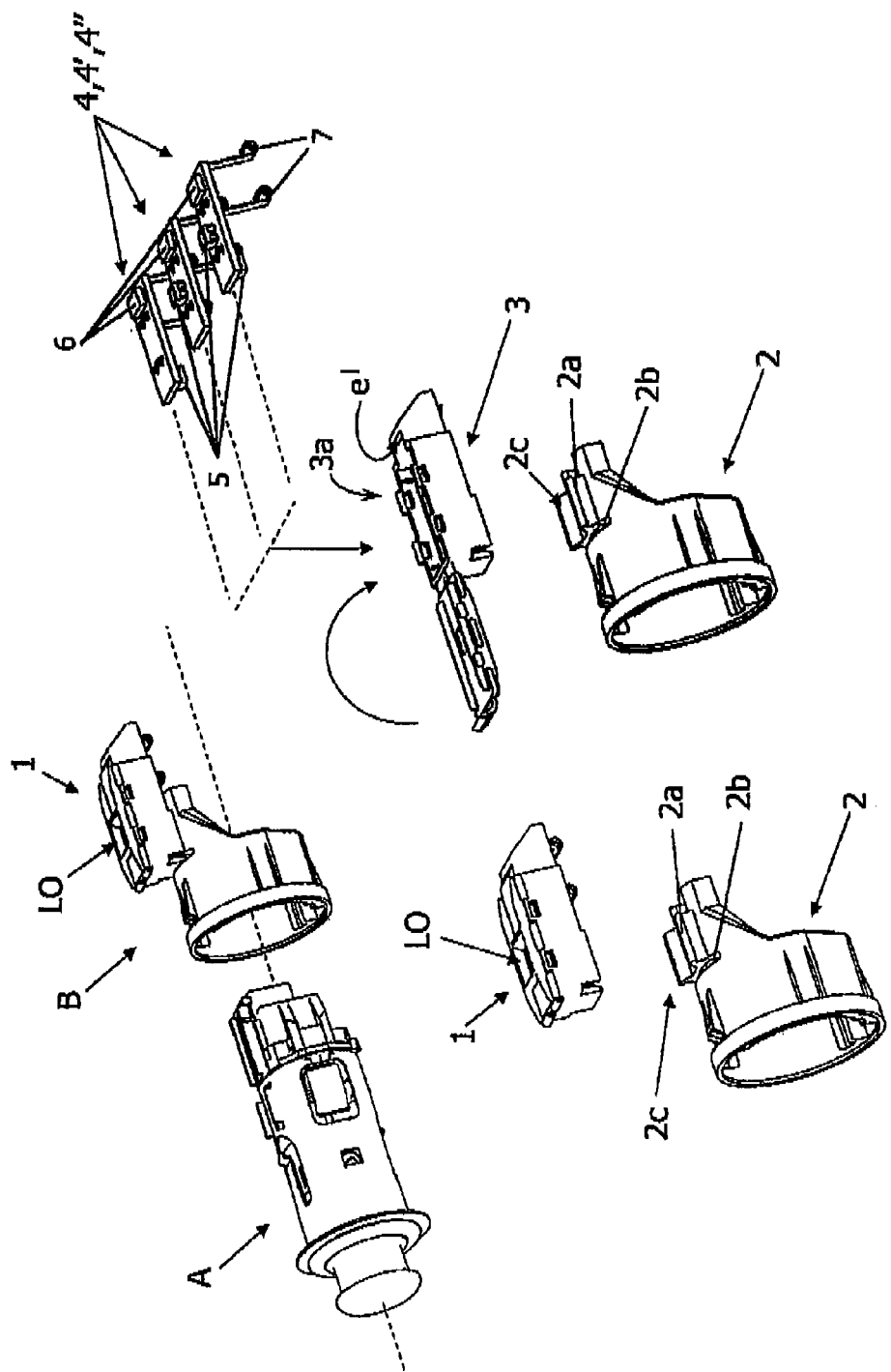
FIG. 2 is an exploded view of the cigarette lighter according to the invention shown in FIG. 1.

The cigarette lighter according to the invention which is shown in FIGS. 1 and 2 is for use in a powered vehicle of the kind defined at the beginning in the introductory section of the description.

The cigarette lighter according to the invention comprises a main unit A, a substantially annular attachment B of transparent and light-guiding material which is slid onto the main unit A, and a lighting unit 1 which is fastened to the attachment B.

The main unit A comprises a substantially cylindrical heating insert A1 and a substantially sleeve-like lighter body A2 to receive the heating insert A1. The cigarette lighter as such is known to the person skilled in the art from the prior art. For this reason a detailed description will not be given at this point of the main unit A of the cigarette lighter according to the invention which is shown in FIGS. 1 and 2.

Mounted on the main unit A of the cigarette lighter is an annular attachment B of transparent light-guiding material for illuminating a region of the cigarette lighter which is visible to a viewer when the cigarette lighter is in its installed state. If light is coupled in at the rear end of the attachment B, the light emerges at the front face of the attachment, thus causing the knob of the cigarette lighter to be surrounded by a lit ring.

For its part, the lighting unit 1 comprises a receiving unit 3 which is all in one piece and which is of a substantially box-like form and which has a first housing part c and a second housing part b which acts as a housing cover, and a lighting insert.

Both the attachment B and the receiving unit 3 of the cigarette lighter according to the invention are in the form of injection mouldings of plastics material. However, unlike the attachment B, the receiving unit 3 does not need to be formed from transparent and light-guiding material. Where there is a receiving unit 3 which is integrated into the attachment B, i.e.

where there is a one-piece structure comprising the attachment B and the receiving unit 3, the plastics material used for the injection moulding may, for simplicity's sake, be transparent and light-guiding in its entirety.

Figure 3:
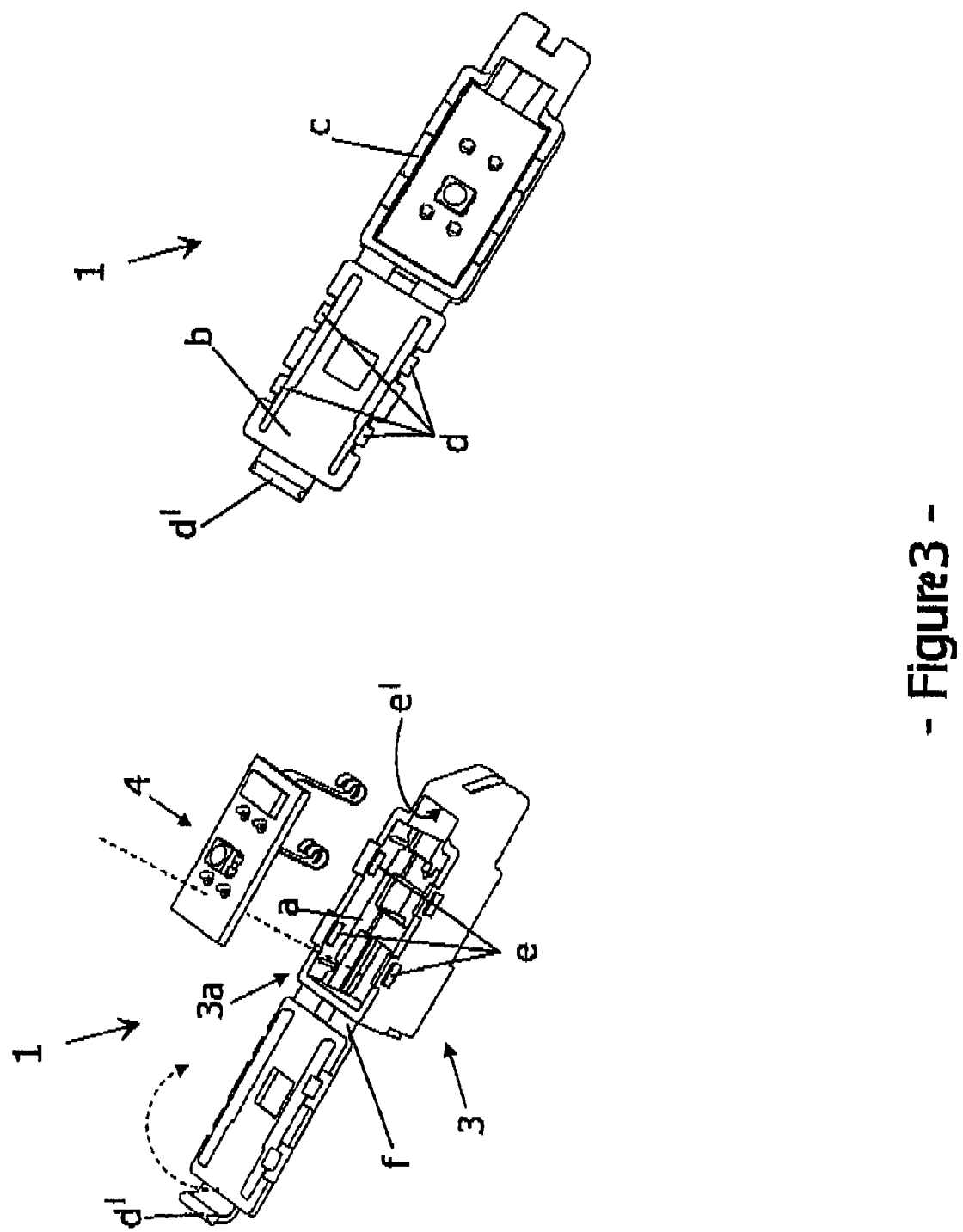
FIG. 3 is an exploded view of the lighting unit of the cigarette lighter according to the invention.

The lighting insert, which is in the form of a rectangular printed circuit board fitted with at least one light-emitting diode (LED) 5 as a light-producing means, is inserted as an exact fit in a substantially rectangular recess 3a in the first housing part c and is fixed in place by means of the second housing part b. In this case, the printed circuit board 4 rests in the recess 3a mainly on a supporting surface which is formed along the two longitudinal sides of the first housing part c and which projects inwards from these (FIG. 3). Because it is all in one piece with the first housing part c, the second housing part b is attached to be rotatable on the first housing part c by means of a film joint f which acts as a closing hinge. To fix the lighting insert in place, the second housing part b is provided with locking members in the form of latching tongues d, d', by means of which the first housing part c is locked to the second housing part b and, when this is done, the lighting insert is fixed in place in the first housing part c (FIG. 3). On each of its longitudinal sides, the second housing part b has two rectangular latching tongues d and on a side situated opposite the film joint f it has a curved latching tongue d', the total of four rectangular latching tongues d snapping or latching into rectangular apertures e provided for the purpose in the longitudinal sides of the first housing part c when the first housing part c is locked to the second housing b, and the latching tongue d' engaging behind a projection e' provided for the purpose at an end of the first housing part c opposite from the film joint f. The lighting unit 1 of the cigarette lighter according to the invention is of a modular basic construction, thus enabling printed circuit boards 4, 4', 4" of different forms to be inserted in the receiving unit.

FIG. 2 shows, in the top right-hand part of the Figure, the different printed circuit boards 4, 4', 4" with which the receiving unit can be fitted. As well as a resistor 6, and contacts 7 which extend away from that side of the printed circuit board which is at the bottom in the in-use position, the printed circuit boards 4, 4', 4" have either one or two light-emitting diodes (LED's) 5. At their free ends, the contacts 7 take the form of contact tabs, which means that when the printed circuit board 4 is in the locked position in the recess 3a they bear against corresponding contacts of the main unit A, which are connected to a vehicle power supply, and are spring-loaded against these.

In a first embodiment of the invention, the printed circuit board 4 (the printed circuit board 4 at the top at the top right of FIG. 2) is fitted with a light-emitting diode (LED) 5 which is arranged on its side which is at the bottom in the in-use position, which light-emitting diode 5 is situated opposite the rear end, for the entry of light, of the attachment B when the printed circuit board is inserted in the receiving unit 3 of the lighting unit 1. It is thus the cigarette lighter which is illuminated.

In an alternative embodiment of the invention, the printed circuit board 4' (the printed circuit board 4 in the centre at the top right of FIG. 2) is fitted with a light-emitting diode (LED) 5 which is arranged on its side which is at the top in the in-use position, which light-emitting diode 5 serves to illuminate an ashtray. For this purpose, the second housing part b of the lighting unit 1 is provided with an aperture LO serving as an exit opening for light, through which the light from the light-emitting diode 5 shines. By means of a light guide (not shown) which is arranged directly in front of the exit opening for light, the light emitted by the light-emitting diode 5 is guided to the ashtray.

In a further alternative embodiment of the invention, the printed circuit board 4" (the printed circuit board 4 at the bottom at the top right of FIG. 2) is fitted with a light-emitting diode (LED) 5 which is arranged on its side which is at the bottom in the in-use position and also with a light-emitting diode (LED) 5 which is arranged on its side which is at the top in the in-use position, which light-emitting diodes serve both to illuminate the attachment B and hence the region of the cigarette lighter which is visible to the viewer when the cigarette lighter according to the invention is in the installed state, and to illuminate the ashtray.

What is more, the use of differently equipped printed circuit boards allows light-emitting diodes of different colors to be used without any major changes having to be made to the arrangement as a whole.

In what follows, the fastening of the lighting unit 1 to the attachment B will be described. On its side which is at the bottom in the in-use position, the receiving unit is provided with a lip 3b and two latching lips 3c (FIG. 4). When the lighting unit 1 is in the fitted state, the lip 3b engages in a slot 2b provided for it in the attachment B, to stop the lighting unit from shifting axially relative to the attachment B, whereas the two latching lips 3c fit, by a snap-on or latch-on action, behind two projections 2a which are provided for them on a fastening portion 2c of the attachment B, which means that the receiving unit 3 is fastened to the attachment B by a snap-on or latch-on action.

What is claimed is:

1. A cigarette lighter, comprising:
a main unit having
a substantially cylindrical heating insert, and
a substantially sleeve-like lighter body for receiving the heating insert, the sleeve-like body including a substantially annular attachment of transparent and light-guiding material which is slidable onto the main unit for illuminating a region of the cigarette lighter which is visible to a viewer when the cigarette lighter is in the installed state,
the attachment having an entry opening for light to couple light into the attachment to enable the attachment to be illuminated;
a lighting unit, fastened to the attachment, having a one piece receiving unit to receive a lighting insert, the lighting insert having at least one light-producing means, the receiving unit having at least one aperture serving as an exit opening for light;
a first housing part for receiving a printed circuit board;
a second housing part which acts as a housing cover; and
a film joint forming a closing hinge coupled to the first and second housing parts to enable the second housing part to rotate on the first housing part,
wherein the lighting insert is arranged in the receiving unit between the entry opening for light in the attachment and the exit opening for light in the receiving unit,
the at least one light-producing means facing towards the entry opening for light in the attachment and/or the exit opening for light in the receiving unit.

2. Cigarette lighter according to claim 1, characterized in that the receiving unit has at least one latching lip by which the receiving unit is fastened to the attachment by a snap-on action.

3. Cigarette lighter according to claim 1, characterized in that the receiving unit has at least one lip by which the receiving unit can be locked in position relative to the attachment.

4. Cigarette lighter according to claim 1, characterized in that the receiving unit has a rectangular recess to receive the printed circuit board, the printed circuit board being of a rectangular form.

5. Cigarette lighter according to claim 1, characterized in that the receiving unit is of a substantially box-like form.

6. Cigarette lighter according to claim 1, characterized in that both the attachment and the receiving unit are in the form of injection mouldings of plastics material.

7. Cigarette lighter according to claim 1, characterized in that the lighting insert is in the form of a printed circuit board.

8. Cigarette lighter according to claim 1, characterized in that the light-producing means is a light-emitting diode.

9. A cigarette lighter, comprising:
   a main unit having
   a substantially cylindrical heating insert, and
   a substantially sleeve-like lighter body for receiving the heating insert, the sleeve-like body including a substantially annular attachment of transparent and light-guiding material which is slidable onto the main unit for illuminating a region of the cigarette lighter which is visible to a viewer when the cigarette lighter is in the installed state,
   the attachment having an entry opening for light to couple light into the attachment to enable the attachment to be illuminated;
   a lighting unit, fastened to the attachment, having a receiving unit to receive a lighting insert, the lighting insert having at least one light-producing means, the receiving unit having at least one aperture serving as an exit opening for light;
   a first housing part for receiving a printed circuit board;
   a second housing part which acts as a housing cover; and
   locking members on the second housing part having at least one rectangular latching tongue and/or at least one curved latching tongue, the rectangular latching tongue latching into at least one rectangular cutout provided for it in the first housing part and the curved latching tongue engaging behind at least one projection which is provided for it on the first housing part;
   the lighting insert being arranged in the receiving unit between the entry opening for light in the attachment and the exit opening for light in the receiving unit, and
   the at least one light-producing means facing towards the entry opening for light in the attachment and/or the exit opening for light in the receiving unit.

* * * * *